S. J. COATNEY.
PLOW.
APPLICATION FILED JULY 17, 1919.
1,333,203.
Patented Mar. 9, 1920.
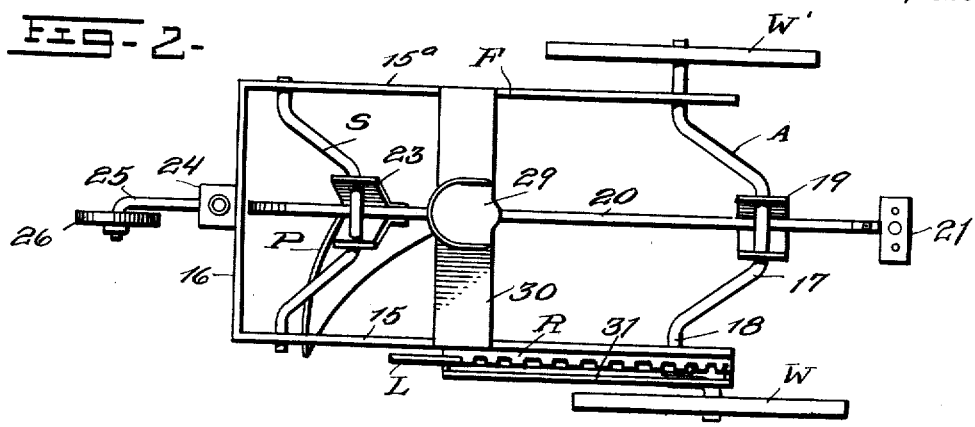
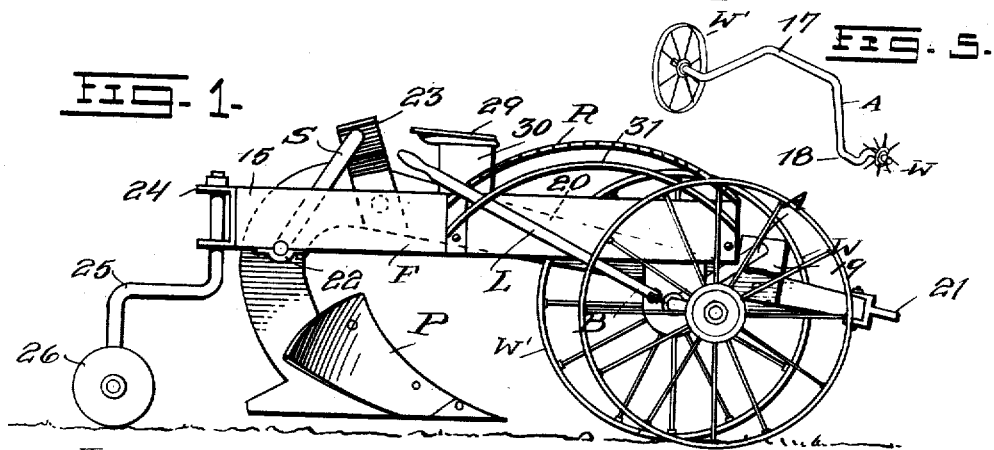
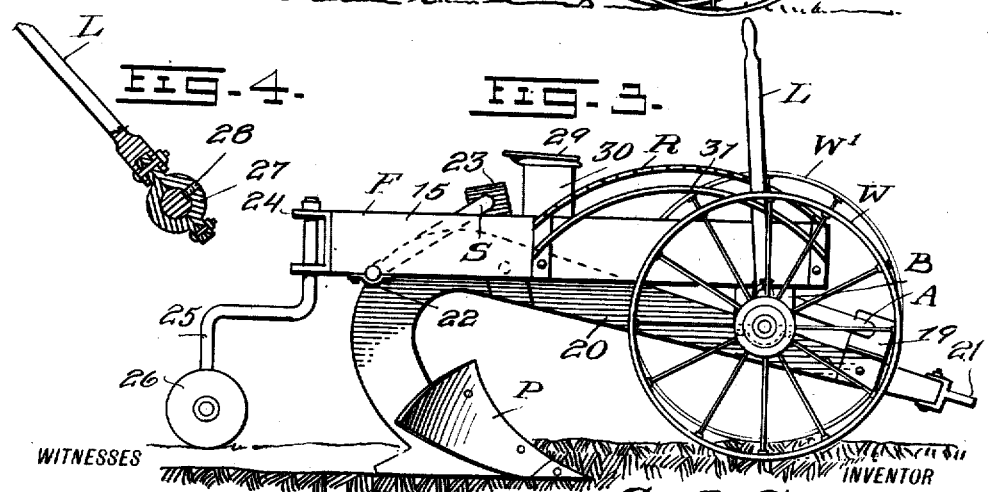
WITNESSES
Wynne Johnson
INVENTOR
S. J. Coatney
BY
ATTORNEYS

UNITED STATES PATENT OFFICE.

STEPHEN JAMES COATNEY, OF FELLOWS, CALIFORNIA.

PLOW.

1,333,203.

Specification of Letters Patent.

Patented Mar. 9, 1920.

Application filed July 17, 1919. Serial No. 311,552.

*To all whom it may concern:*

Be it known that I, STEPHEN JAMES COATNEY, a citizen of the United States, and a resident of Fellows, in the county of Kern and State of California, have made certain new and useful Improvements in Plows, of which the following is a specification.

My invention relates to plows of the wheeled or sulky type, and particularly to wheeled plows of that character in which provision is made for raising and lowering the plow with relation to the supporting wheels and locking the implement in up and down and intermediate positions.

An object of my invention is the provision of a simple and efficient plow elevating mechanism which includes a one piece axle so formed as to effect the raising and lowering of a plow by one operating lever and without disturbing the position of the plow frame, so that irrespective of the vertical adjustment of the plow, the frame maintains its normal level. The manner in which the one piece axle is bent is such as to eliminate numerous parts, which have heretofore been necessary to the successful operation of an elevating mechanism, thus providing a mechanism having that desirable characteristic which allows of its production at a minimum cost.

Another object of my invention is the provision of an elevating mechanism which raises or lowers one of the supporting wheels simultaneously with the movement of the plow.

I will describe one form of plow embodying my invention and will then point out the novel features thereof in claims.

In the accompanying drawings:

Figure 1 is a view showing in side elevation one form of plow embodying my invention with the plow in elevated position;

Fig. 2 is a top plan view of Fig. 1;

Fig. 3 is a view similar to Fig. 1 with the plow in lowered position;

Fig. 4 is a detailed view of the connecting means between the axle and the operating lever;

Fig. 5 is a detailed perspective of one form of axle embodying my invention.

Similar reference characters refer to similar parts in each of the several views.

Referring specifically to the drawings, F designates a frame comprising the parallel portions 15 and 15ª, which are connected at their rear ends by a transverse portion 16. Secured to and depending from the frame F adjacent the forward ends of the parallel portions 15 and 15ª are a pair of brackets B, in which is journaled an axle A. The opposite ends of the shaft A project beyond the parallel portions of the frame F, which carry supporting wheels W and W'. That portion of the axle A which is disposed between the parallel portions 15 and 15ª is bent to provide a crank 17, while that portion of such shaft which is disposed on the outer side of the portion 15 is also bent to provide a relatively large crank 18 upon which the wheel W is journaled.

Pivotally connected to the crank 17 is a bracket 19, which is adjustably mounted upon the forward end of a plow beam 20 of a plow P. As shown in Fig. 3, the bracket 19 may be adjusted longitudinally upon the plow beam 20 by placing the screw bolt of the bracket in any one of the perforations 21 formed in the plow beam 20. The rear end of the plow beam is movably supported upon the frame F by means of a crank shaft S, which is journaled in bearing plates 22, its intermediate portion being pivotally connected to the plow beam 20 by means of a bracket 23.

To support the rear end of the plow frame, I provide a yoke 24 which is secured to the transverse portion 16 of the frame F, in which is journaled the shaft 25 carrying at its lower end a caster wheel 26.

By actuating the axle A to raise and lower the plow P and the wheel W, I provide an operating lever L, which is fixed to the axle L' by means of a divided sleeve 27 which is clamped about the axle and locked against movement thereon by means of a set screw 28, as clearly shown in Fig. 4. To effect a locking of the axle A in up and down and intermediate positions, I provide a segmental rack R, which is secured to the portion 15 of the frame F. The lever L is formed of a resilient metal to permit longitudinal flexing thereof, so that in moving the axle A from one adjusted position to the other, the lever L can be moved out of and into engagement with the teeth of the rack R by bending the same outwardly from the frame without disturbing its connection with the axle. After the lever has moved between any two adjacent teeth of the rack R the inherent resiliency of the metal of which it is formed, will maintain the lever in locked position between the teeth; that is to say, the lever L is normally biased into engagement with the rack R and to move the lever to releasing position it is necessary to bend the lever against its bias.

The lever L is of such a length that it may be readily moved to its various positions by an operator located on a seat 29, supported between the parallel portions of frame F by a yoke 30. To confine the lever L within a restricted zone during its movement from one position to the other, I provide a guide bar 31, which is of a shape corresponding to the rack R and is disposed slightly below the same.

The operation of the plow is as follows: As shown in Fig. 1, the plow P occupies its uppermost position. When it is desired to lower the plow to the position shown in Fig. 3, or to any intermediate position, the lever L is released from the rack R and then moved forwardly to the desired position where it again engages the rack R and is locked against further movement. During this forward movement of the lever L, the axle A is moved in a clockwise direction, thus causing the crank 17 to lower the forward end of the plow beam 20 and thereby imparting a corresponding movement to the crank shaft S, so that the rear end of the plow beam and consequently the plow B is also lowered. By virtue of the small crank 18, the wheel W is simultaneously lowered with the lowering of the plow. The purpose of adjusting the wheel W simultaneously with the plow P is to maintain the frame F at is normal level during the plowing operation. By virtue of the disposition of the plow P, the wheel W will ride into the plowed portion of the ground, so that without this vertical adjustment the wheels W and W' would move in different planes and thus cause the frame F to assume an inclined position. It will therefore be seen that irrespective of the position of the plow P, the frame F will maintain its normal level. When raising the plow P, it will be obvious that the lever L will be moved in the reverse direction or rearwardly, so that the axle A and the shaft S are rotated in a counter-clockwise direction.

From the foregoing description it will be manifest that I have provided an elevating mechanism for the plow and one of the supporting wheels which is extremely simple in its construction, and which may be operated to effect any desired adjustment of the plow and wheel by the actuating of a single lever. The forming of the axle A of one piece and providing the same with the two cranks to effect an adjustment of the plow and one supporting wheel simultaneously is one of the important features of my invention. Another important feature is the fact that the frame is maintained in its normal level at all times irrespective of the adjustment of the plow.

Although I have herein shown and described only one form of plow embodying my invention, it is to be understood that various changes and modifications may be made herein without departing from the spirit of the invention and the spirit and scope of the appended claims.

Having described my invention, what I claim is:—

1. A wheeled plow, comprising a frame, an axle journaled in the frame, wheels journaled on the ends of said axle, a plow, a crank shaft journaled on the frame and pivotally connected to the beam of said plow, and an operating lever connected to said axle and capable of occupying two extreme positions, said axle being formed with cranks, one of which is connected to said beam whereby said plow and one of said wheels are raised or lowered according as said lever occupies one extreme position or the other.

2. A wheeled plow, comprising a substantially U-shaped frame, an axle journaled in the frame adjacent the free ends thereof, said axle being formed with a crank between the parallel portions of the frame, a second crank at a point exteriorly of the frame, a wheel journaled on the end of said second crank portion of said axle, a second wheel journaled on the opposite end of said axle at a point exteriorly of said frame, a crank shaft journaled in the opposite end of the frame from said axle, a plow, an extension formed on the beam of said plow and pivotally connected to said crank shaft, a second extension formed on said plow beam and pivotally connected to the first crank of said axle, and means for rotating said axle.

STEPHEN JAMES COATNEY.